United States Patent [19]

McIntyre

[11] Patent Number: 5,706,037

[45] Date of Patent: Jan. 6, 1998

[54] SYSTEM AND METHOD FOR OVERRIDING A LOW MARKING MATERIAL STATUS IN A FACSIMILE ENVIRONMENT

[75] Inventor: Lloyd F. McIntyre, Plano, Tex.

[73] Assignee: Xerox Corporation, Stamford, Conn.

[21] Appl. No.: 534,781

[22] Filed: Sep. 28, 1995

[51] Int. Cl.⁶ .............. H04N 1/034; H04N 1/21; H04N 1/23

[52] U.S. Cl. .............. 347/3; 358/296

[58] Field of Search .............. 347/3, 6, 17, 19, 347/7, 14; 358/296, 404

[56] References Cited

U.S. PATENT DOCUMENTS

| | | | |
|---|---|---|---|
| 3,409,901 | 11/1968 | Dost et al. | 346/74 |
| 4,121,222 | 10/1978 | Diebold et al. | 346/75 |
| 4,202,267 | 5/1980 | Heinzl et al. | 101/364 |
| 4,368,478 | 1/1983 | Koto | 346/140 R |
| 4,468,112 | 8/1984 | Suzuki et al. | 355/14 D |
| 4,566,014 | 1/1986 | Paranjpe | 346/1.1 |
| 4,847,659 | 7/1989 | Resch, III | 355/202 |
| 4,908,666 | 3/1990 | Resch, III | 355/246 |
| 4,935,751 | 6/1990 | Hamlin | 346/140 R |
| 4,961,088 | 10/1990 | Gilliland et al. | 355/206 |
| 5,049,898 | 9/1991 | Arthur et al. | 347/19 |
| 5,204,698 | 4/1993 | LeSueur et al. | 346/160 |
| 5,204,699 | 4/1993 | Birnbaum et al. | 346/160 |
| 5,206,668 | 4/1993 | Lo et al. | 346/140 R |
| 5,283,613 | 2/1994 | Midgley, Sr. | 355/203 |
| 5,315,397 | 5/1994 | Inoue et al. | 358/296 |

OTHER PUBLICATIONS

English Translation of Japanese Patent No. 3058854–A2.

*Primary Examiner*—Benjamin R. Fuller
*Assistant Examiner*—Thinh Nguyen
*Attorney, Agent, or Firm*—Michael J. Nickerson

[57] ABSTRACT

A method and system for printing during a low ink condition. The system receives a user override instruction and determines if an amount of available ink is greater than a no ink condition. The system prints a page stored in a memory when the amount of available ink is greater than a no ink condition. The system also deletes a previously printed and stored page from the memory before the system prints the page from memory. After the printing process, the amount of available ink is updated. If the amount of available ink is equal or less than a no ink value, the system prevents the printing of the page in memory and the deletion of the previously printed and stored page in the memory.

8 Claims, 3 Drawing Sheets

SYSTEM AND METHOD FOR OVERRIDING A LOW MARKING MATERIAL STATUS IN A FACSIMILE ENVIRONMENT

FIELD OF THE PRESENT INVENTION

The present invention is directed to overriding a state of low marking material in a facsimile environment. More specifically, the present invention is directed to a system and method for overriding an indication of a low ink status state when attempting to print a document that has been received from a transmitter with a thermal ink jet receiver.

BACKGROUND OF THE PRESENT INVENTION

Conventionally, an ink jet facsimile receiver operates during a facsimile transmission according to the flow chart illustrated in FIG. 2. More specifically, as illustrated in FIG. 2, the ink jet facsimile receiver remains idle until a transmission signal is received at step S1 from a facsimile transmitter. To ensure a proper facsimile transmission, the receiver and transmitter sends signals back and forth in a handshake manner so as to establish the facsimile connection. Once a facsimile connection has been established at step S1, the receiver determines at step S3 whether the receiver is in a low ink status state.

The low ink status state can be realized in many conventional ways. For example, the number of drops generated by the thermal ink jet printer can be counted and used to determine the volume of ink used. It is noted that the volume of an individual drop can be determined for a particular printer. In knowing the volume used, the printer can establish the volume of ink remaining (the initial volume in the disposable thermal ink jet printing head minus the volume used) and compare it with a statistically determined low ink value. When the remaining volume falls below this value, a low ink state is triggered.

If the receiver is not in a low ink status state, the receiver will begin accepting the transmitted data at step S7 and print the received data. However, if the receiver is in a low ink status state and the receiver has no auxiliary memory to store the incoming data, the receiver sends a message to step S5 to the transmitter terminating the facsimile connection.

On the other hand, if the facsimile receiver has an auxiliary memory, the receiver can instead of terminating the facsimile connection, merely store the incoming data in memory so as to print the data out at a later time when the ink status is more conducive to printing.

A problem, associated with having such a low ink status protection feature and an auxiliary memory is that when the receiver enters a low ink status state, the facsimile receiver is now inoperable until the ink supply is replenished. However, a low ink status state does not necessarily indicate a full depletion of the ink in the facsimile receiver, but usually, indicates that a small reserve of ink is left in the ink cartridge so that only a limited number of pages can be printed with this supply. This protection is triggered at a level above total empty so as to statistically print all incoming jobs at a predetermined confidence level. Thus, in the conventional devices, the low ink status feature prevents the printing of many small jobs whose ink requirements are less than the amount of ink remaining in the ink cartridge when the low ink status state is triggered.

In view of the problem with conventional facsimile systems, the present invention proposes a system which overrides the low ink status state such that a receiver can print a small document (small number of sheets in the document) from the auxiliary memory when the ink requirements for the smaller document is less than the reserved amount of ink still present in the ink cartridge and prevents the printing of documents when the ink volume reaches a lower level.

SUMMARY OF THE PRESENT INVENTION

One aspect of the present invention is a method for printing a document during a low ink condition. The method receives a user override instruction; determines if an amount of available ink is greater than a no ink condition; prints a page stored in a memory when the amount of available ink is greater than a no ink condition; and deletes a previously printed and stored page from the memory upon printing the page stored in the memory.

Another aspect of the present invention is a method for printing a document during a low ink condition. The method receives a user override instruction; determines if an amount of available ink is greater than a no ink condition; prints a document stored in a memory when the amount of available ink is greater than a no ink condition; and deletes a previously printed and stored document from the memory upon printing the document stored in the memory.

A third aspect of the present invention is a system for printing during a low ink condition. The system includes a memory to store documents to be printed; input means for inputting a user override instruction; comparison means for determining if an amount of available ink is greater than a low ink condition; print means for printing a page stored in the memory; deletion means for deleting a previously printed and stored page from the memory; and a controller to control the operations of the print means and the deletion means. The controller prevents the print means from operating when said comparison means determines that the amount of available ink is not greater than a low ink condition. The controller causes the deletion means to delete a previously printed and stored page from the memory when the input means inputs the user override instruction and causes the print means to print a page stored in the memory thereafter.

Further objects and advantages of the present invention will become apparent from the following description of the various features of the present invention.

BRIEF DESCRIPTION OF THE DRAWINGS

The following is a brief description of each drawing used in describing the present invention, and thus, are being presented for illustrative purposes only and should not be limitative of the scope of the present invention, wherein.

DETAILED DESCRIPTION OF THE PRESENT INVENTION

Figure 1:
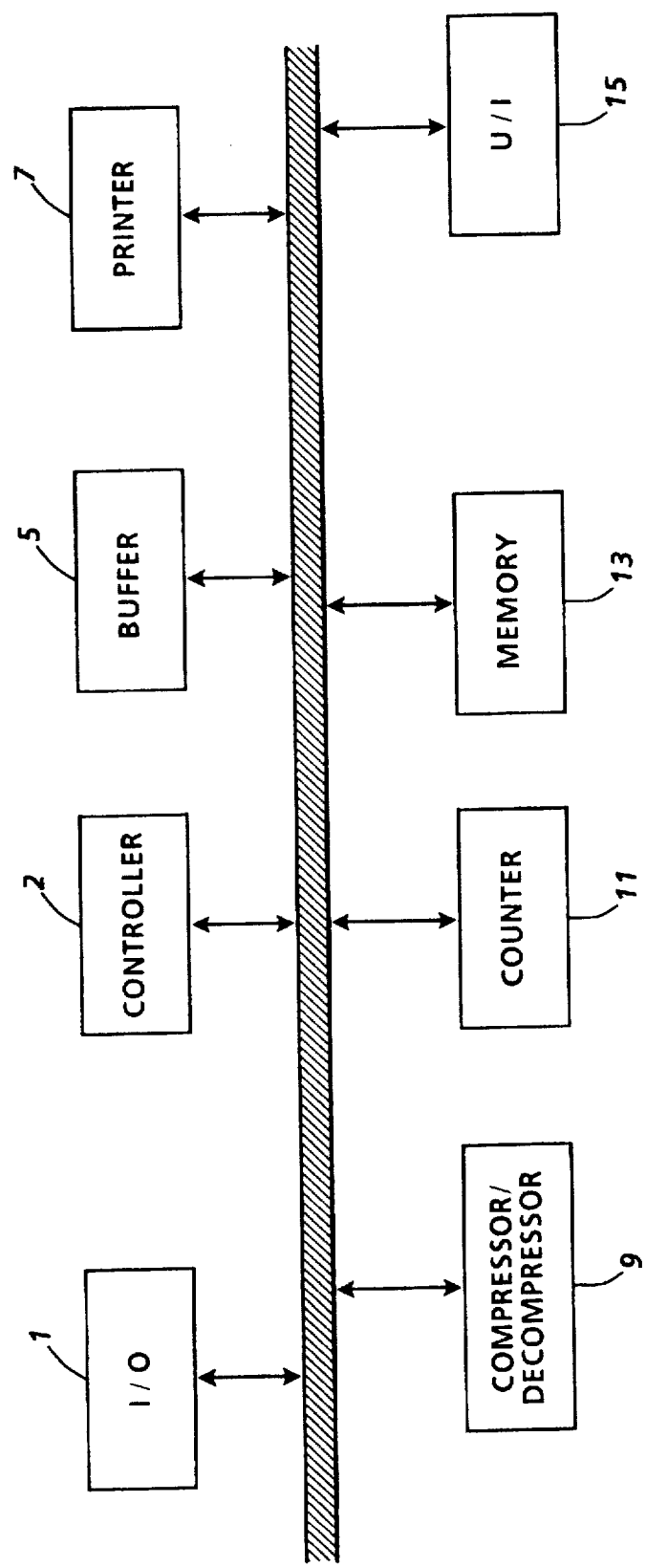
FIG. 1 is a block diagram illustrating the overall architecture of the facsimile system of the present invention.

For a general understanding of the facsimile override system incorporating the various features of the present invention, reference is made to the drawings. In the drawings and in the specification, like reference numerals have been used through out this description to designate identical or equivalent elements or steps.

As noted above, FIG. 1 illustrates an overall architecture for the facsimile system of the present invention. In the facsimile system of the present invention, an input/output circuit (I/O port) 1 connects the facsimile system to a network or local telecommunication channel or line so that the facsimile system can transmit and receive image data. The facsimile system further includes a compressor/decompressor 9 which compresses the image data prior to the image data being transmitted through the I/O port 1 to another facsimile system, remote or local printer, or other network citizen device and decompresses the image data received through the I/O port 1 from another facsimile system or network citizen device.

A buffer 5 is included in the facsimile system to provide the necessary buffering of the image data as it is received from outside the facsimile system or prior to being transmitted out of the facsimile system through the I/O port 1. A scanner 3 is utilized by the facsimile system to scan in the image from a hard copy and to convert this image into electronic or optical image data for transmission through the I/O port 1. In conjunction with the scanner 3, a printer or image output terminal 7 is included to generate a hard copy of the image data received through the I/O port 1. A memory 13 is provided to store an incoming job when the ink status is such that the incoming job cannot be properly printed or other condition that prevents the job from being printed or the user has selected a storage mode over a print mode.

Lastly, the facsimile system includes a controller 2 which controls the overall operations of the facsimile system so as to coordinate the various operations between the individual components described above and their operations with devices outside the facsimile system and a counter 11 which counts the drops rendered by the printer 7. It is noted that the I/O port 1, the controller 2, the printer 7, the compressor/decompressor 9, the buffer 5, the memory 13, the counter 11, and the scanner 3 can be all interconnected to each other through a bi-directional bus or buses within the facsimile system.

Figure 2:
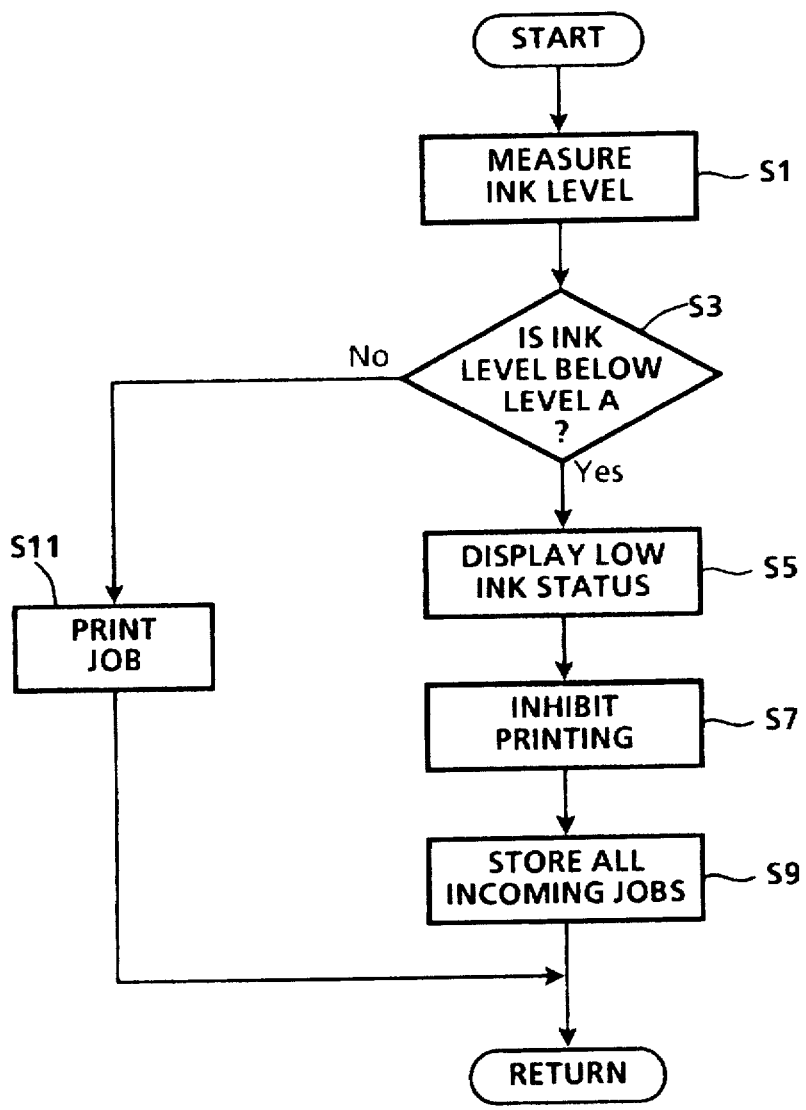
FIG. 2 is a flowchart illustrating a method of carrying out a facsimile transmission.

FIG. 2 illustrates a method for handling a low ink condition in a thermal ink jet facsimile or printing machine. As illustrated in FIG. 2, prior to printing a job, the inkjet system measures the amount of ink remaining in the system which can be utilized in rendering a job.

This measuring of the amount of available ink can be carried out in one of many conventional ways. An example of such a system is disclosed in U.S. Pat. No. 4,961,088. The entire contents of U.S. Pat. No. 4,961,088 are hereby incorporated by reference.

As disclosed in U.S. Pat. No. 4,961,088, the conventional printing system uses a digital image generator to generate the image to be printed as an electronic pixel stream, which is tapped and sent to be both frequency or rate analyzed and also counted with a weighting factor assigned by the frequency analysis, to obtain a weighted pixel count. This provides a toner consumption estimate calculation which in turn can be subtracted from the (known) original amount of toner in the toner container to determine the remaining amount of toner and provide a signal indicating a low marking material condition.

In other words, a customer replaceable unit ("CRU") toner cartridge comes pre-filled with a specified (known constant) initial amount of toner, which is known to the printer in the system. That number is stored as a weighted pixel count in ROM, EPROM, or other non-volatile memory. As each page is printed, the pixel frequency is monitored for that page, and an estimation of the average image type is determined for that page. The number of pixels for page is then assigned a weight per pixel. This calculated toner amount is subtracted from the remaining balance of toner. This new toner amount balance value is saved. The next page of pixels is then calculated and subtracted from this value. This process continues until the warning level for remaining toner is attained. The user is then alerted that the toner CRU is nearing it's "end-of-life" condition. The process continues until a calculated remaining toner amount of zero is attained, which should coincide with the toner cartridge being empty. That is, continuously subtracting calculated toner usage this way from the known initial installed toner amount until the balance amount reaches zero automatically gives an "out of toner" indication, without ever actually sensing or examining the toner container itself.

Other examples of conventional systems which calculate how much of a document will be rendered are U.S. Pat. No. 5,283,613; U.S. Pat. No. 5,204,699; U.S. Pat. No. 5,204,698; U.S. Pat. No. 3,409,901; U.S. Pat. No. 4,847,659; U.S. Pat No. 4,468,112; and U.S. Pat. No. 4,908,666. The entire contents of U.S. Pat. No. 5,283,613; U.S. Pat. No. 5,204,699; U.S. Pat. No. 5,204,698; U.S. Pat. No. 3,409,901; U.S. Pat. No. 4,847,659; U.S. Pat. No. 4,468,112; and U.S. Pat. No. 4,908,666 are hereby incorporated by reference.

Thus, the inkjet printer or facsimile terminal of the present invention, by using counter 11, can keep a running total of the number of inkjet drops which have been expelled from the inkjet head and subtract this number from a total number of inkjet drops available in a new cartridge so as to arrive at the amount of available ink in the facsimile or printer terminal.

After determining the amount of ink available at step S1, the conventional process then compares this result with a reference value corresponding to a low ink condition at step S3. If the amount of available ink is greater than the low ink status value, the job is printed at step S11. However, if the amount of available ink is equal to or less than the low ink status value, the facsimile terminal or printer displays a low ink status indicator at step S5 and inhibits any further printing at this terminal at step S7. Lastly, if a low ink status is reached, the facsimile terminal or the server controlling the printing terminal will store all future incoming jobs to be printed until after the low ink status condition is corrected.

Figure 3:
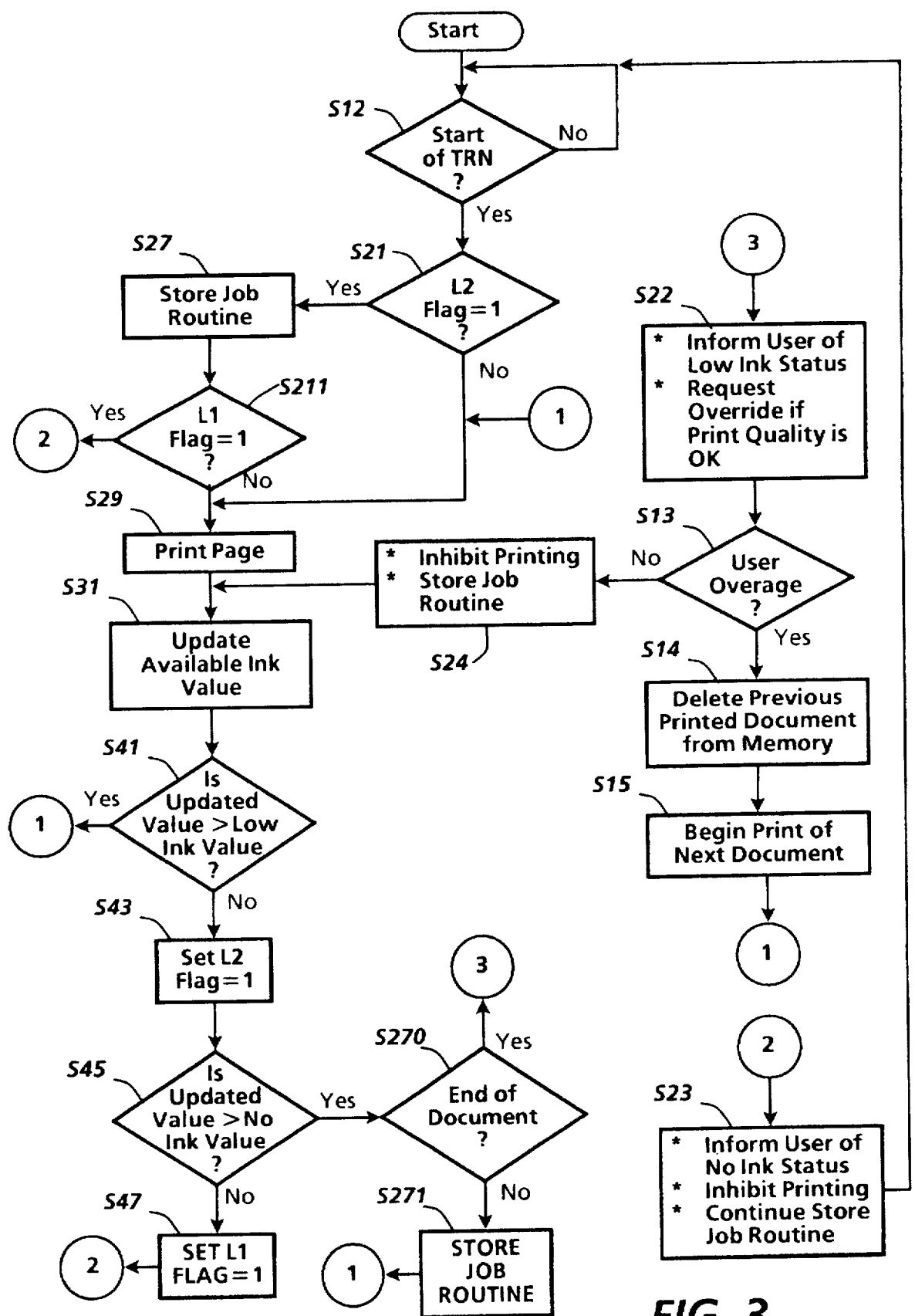
FIG. 3 is a flow chart illustrating a method of overriding a low ink status in a receiver according to the present invention.

FIG. 3 illustrates a method of one embodiment of the present invention which prevents the loss of data due to a low ink condition and enables the operator to manually override a low ink condition so as to maximize the productivity of an ink cartridge. As illustrated in FIG. 3, step S12 determines whether a print job is starting. If a print job is starting, the process proceeds to step S21. Step 21 determines whether a low ink flag L2 has been set.

If the low ink flag L2 has been set, the incoming print (facsimile) job is stored at step S27. However, if the low ink flag L2 has not been set, the job is printed at step S29. The process then continues onto step S31 wherein the present invention updates the amount of available ink using any of the conventional methods described above. In other words, the present invention determines at step S31 the amount of ink available at the inkjet base printing terminal for the rendering of future jobs.

After the determination of the amount of available ink, step S41 determines whether the updated amount of available ink is greater than a reference low ink value. If the updated amount of available ink is less than or equal to the reference low ink value, step S43 sets the low ink condition flag L2 to 1 indicating low ink status. After setting the low ink condition flag L2 to 1, the process determines at step S45 whether the updated amount of available ink is greater than a reference no ink value. If the updated amount of available ink is equal to or less than a reference no ink value, step S47 sets a no ink flag L1 to 1 indicating that the facsimile terminal no longer has enough ink to print documents. The process then advances to step S23 which informs the user of the no ink status, inhibits further printing, and allows for the continual storing of future job routines. Thus, no further printing can take place until the ink supply of the facsimile terminal is replenished.

If the updated amount of available ink is greater than a reference no ink value, step S270 determines if the end of the document has been reached. If step S270 determines that the end of the document has been reached, the process goes to step S22, otherwise the present invention stores the job routine at step S271 and advances to step S29.

At step S22, the user is informed of the low ink status and a request for an override from the user is sent. If a user override signal has been received at step S13, step S14 deletes the previously printed document from the memory and step S15 begins the printing process for the next document in memory by having the process advance to step S29. If a user override signal has not been received at step S13, step S24 inhibits the printing process and stores the job routine before advancing the process to step S31.

As noted above, one aspect of the present invention is the determination of the current ink level in the machine. This procedure can be carried out in one of many conventional manners.

For example, a thermal inkjet printer generates discreet drops of ink through multiple nozzles. The generation of these drops is digitally controlled as the head is passed over the recording medium and can be easily quantified. The number of drops that can be generated from a disposable head can be established through analytical means since the volume of ink within a head is known and the volume of each drop is known. A cumulative digital count of the number of drops that are generated as documents are printed is derived from the printer driver and accumulated in a drop count memory which is part of counter 11 of FIG. 1. Also, the drops that result from various priming operations are counted and accumulated.

This count is continually compared with a no ink cartridge value which corresponds to the condition where the ink supply has been statistically expended. Also, this cumulative count is continually compared with a low ink status condition value which corresponds to the state where the ink supply is close to having been expended. When the low ink status condition is encountered, the present invention will display a message and the printing of the document in progress will be automatically completed.

However, subsequently received pages will be directed to the memory 13. As noted above, the operator will have the option to manually initiate printing of the next document in memory through the activation of a user override function on the user interface. In the preferred embodiment of the present invention, it is the activation of the start button which provides the override function. Activation of the override feature also serves to delete from the memory the previous document with the understanding that the quality of that document was acceptable.

When the no ink value is reached, the present invention displays a message indicating to the operator of the no ink condition and ceases all print operations. It is noted that this no ink condition cannot be overridden by the operator. To resume printing operations, the print head of the facsimile terminal must be replaced and the ink drop counter reset to zero by the operator. After the print head is replaced, all normal unattended and attended printing operations can then be resumed.

Although the present invention has been described with respect to inks, the present invention is equally applicable to other aspects of a facsimile operation. For example, the present invention can be used to override a low paper status or a low memory status.

Moreover, the present invention is also applicable to a color system. In such a system, each color would have the process described above associated therewith, and the individual processes would be carried out in parallel to determine the status for each material.

Also, the present invention can be carried out in software by an appropriate processor or the present invention can be realized in a hardwired circuit which carry out the function described above the present invention can also be easily modified to be incorporated into a network or other printing system.

While the present invention has been described with reference to various embodiments disclosed above, it is not confined to the details set forth above, but is intended to cover such modifications or charges as may come within the scope of the attached claims.

What is claimed is:

1. A method for printing a document on a printing device, comprising the steps of:

(a) storing a print job in a memory;
   (b) printing a page of the document;
   (c) updating an amount of marking material that is available in the printing device after printing a page of the document;
   (d) determining if the updated amount is less than or equal to a low marking material reference value;
   (e) establishing a low marking material status condition when said step (d) makes a positive determination;
   (f) determining if the updated value is greater than a no marking material reference value;
   (g) determining if the printing device has completed printing the document when said step (f) makes a positive determination;
   (h) informing a user of a low marking material condition and requesting a user override input when said step (g) makes a positive determination; and
   (i) deleting a previously printed document from the memory when a user override input is received.

2. The method as claimed in claim 1, further comprising the step of:

(j) begin printing a next document after execution of said step (i).

3. The method as claimed in claim 1, further comprising the step of:

(j) informing a user of a no marking material condition when said step (f) makes a negative determination.

4. The method as claimed in claim 1, further comprising the step of:

(j) inhibiting printing when no user override input is received.

5. A method for printing a document on a printing device, comprising the steps of:

(a) storing a print job in a memory;
   (b) printing a page of the document;

(c) updating an mount of ink that is available in the printing device after printing a page of the document;

(d) determining if the updated mount is less than or equal to a low ink reference value;

(e) establishing a low ink status condition when said step (d) makes a positive determination;

(f) determining if the updated value is greater than a no ink reference value;

(g) determining if the printing device has completed printing the document when said step (f) makes a positive determination;

(h) informing a user of a low ink condition and requesting a user override input when said step (g) makes a positive determination; and (i) deleting a previously printed document from the memory when a user override input is received.

6. The method as claimed in claim 5, further comprising the step of:

(j) begin printing a next document after execution of said step (i).

7. The method as claimed in claim 5, further comprising the step of:

(j) informing a user of a no ink condition when said step (f) makes a negative determination.

8. The method as claimed in claim 5, further comprising the step of:

(j) inhibiting printing when no user override input is received.

* * * * *